3,140,951
DESENSITIZING DYES AND PHOTOGRAPHIC
PROCESSES AND MATERIALS
Donald W. Heseltine and Leslie G. S. Brooker, Rochester,
N.Y., assignors to Eastman Kodak Company, Rochester,
N.Y., a corporation of New Jersey
No Drawing. Filed June 10, 1963, Ser. No. 286,488
17 Claims. (Cl. 96—101)

This invention relates to a new class of undissociated polymethine dyes, and more particularly to undissociated, trinuclear dyes derived from 2,5-dihydroxy-1,4-benzoquinone which function as good desensitizers in photographic emulsions, and to methods for preparing these new dye compounds.

The new class of polymethine dyes of the invention include those represented by the following general formulas:

(I)

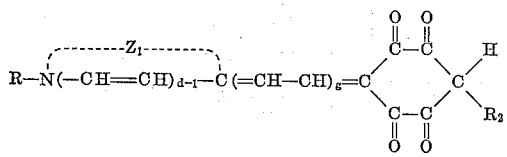

and (II)

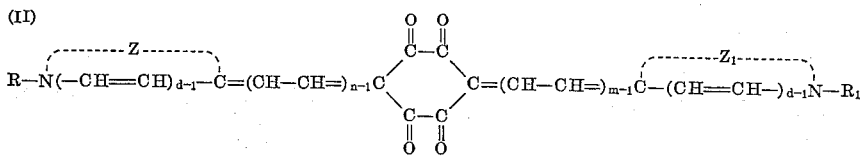

wherein $n$ and $m$ each represents a positive integer of from 1 to 3 and $d$ represents a positive integer of from 1 to 2, R and $R_1$ each represents an alkyl group of from 1–12 carbon atoms, e.g., methyl, ethyl, propyl, ispropyl, butyl, isobutyl, amyl, decyl, dodecyl, β-hydroxyethyl, γ-hydroxypropyl, β-methoxyethyl, β-ethoxyethyl, allyl, benzyl, β-phenylethyl, β-sulfoethyl, γ-sulfopropyl, ω-sulfobutyl, carboxymethyl, β-carboxyethyl, γ-carboxypropyl, β-acetoxyethyl, carbomethoxyethyl, β-carbethoxyethyl, etc., $R_2$ represents the hydrogen atom, an alkyl group of from 1–18 carbon atoms, e.g., methyl, ethyl, propyl, isopropyl, butyl, isobutyl, sec-butyl, hexyl, decyl, dodecyl, octadecyl, benzyl, β-phenylethyl, or an aryl group, e.g., phenyl, p-tolyl, o-tolyl, etc., and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-pehnylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5 - methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), those of the 1-substituted imidazole series (e.g., 1-ethylimidazole, 1-ethyl-4-phenylimidazole, 1,4-dimethylimidazole, 4-methyl-1-phenylimidazole, etc.), those of the 1-substituted benzimidazole series (e.g., 1-ethylbenzimidazole, 1-butylbenzimidazole, 1-ethyl-4,5-dichlorobenzimidazole, etc.), those of the 1-substituted naphthimidazole series (e.g., 1-methyl-α-naphthimidazole, 1-ethyl-α-naphthimidazole, 1-butyl-β-naphthimidazole, 6-chloro-1-methyl-α-naphthimidazole, etc.), etc., and $g$ represents the integer 1 or 2.

The above-defined dyes are very strong desensitizers for light-sensitive silver halide emulsions and are used advantageously in emulsions where desensitization is required.

It is, accordingly, an object of the invention to provide a new class of polymethine dyes. Another object is to provide a new class of polymethine dyes that are valuable for use in photographic silver halide emulsions. Another object is to provide a new class of chemical intermediates from which these new dyes can be derived. Another object is to provide photographic silver halide emulsions containing these new dye compounds as desensitizers. Another object is to provide methods for preparing these new compounds and photographic materials thereof. Other objects will become apparent hereinafter from a consideration of the description and examples.

In accordance with the invention, we prepare the new undissociated compounds represented by above Formula I by reacting a dihydroxybenzoquinone having the general formula:

(III) 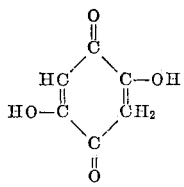

wherein $R_2$ is as previously defined, with a cyclammonium quaternary salt selected from those represented by the general formula:

(IV) 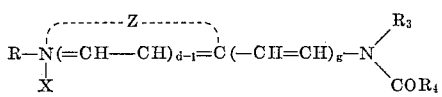

wherein $d$, R and Z are as previously defined, $g$ is the integer 1 or 2, $R_3$ represents an aryl group, e.g., phenyl, p-tolyl, etc., $R_4$ represents an alkyl group of from 1–3 carbon atoms, e.g., methyl, ethyl, propyl or isopropyl groups, and X represents an acid anion, e.g., chloride, bromide, iodide, thiocyanate, sulfamate, methyl sulfate, ethyl sulfate, perchlorate, p-toluenesulfonate, and the like. The above condensation reaction is effected by heating the reaction mixture up to its refluxing temperature, preferably in an inert solvent such as ethanol, propanol, dioxane, pyridine, quinoline, isoquinoline, and the like. Advantageously, a condensing agent, such as a tertiary amine can be employed, e.g., triethylamine, tripropylamine, tributylamine, N-methylpiperidine, N-ethylpiperidine, N,N-dimethylaniline, N,N-diethylaniline, etc. Preferably, the dihydroxybenzoquinone compound is employed in excess, i.e., in an amount greater than a molecular equivalent of the reactant represented by above formula.

For the preparation of the dye compounds corresponding to above Formula II, wherein Z and $Z_1$ are the same heterocyclic groups and $n$ and $m$ are the same or different integers, a number of methods can be used. For example, the general procedure described above for the preparation of the dye compounds of Formula I can be used, except that the intermediate of Formula III is 2,5-dihydroxy-1,4-benzoquinone and in the proportion of approximately one mole thereof to two moles of the appropriate cyclammonium salt. For example, to make compounds of Formula II in which $n$ and $m$ are 2 or 3, one would use to advantage the cyclammonium quaternary salt of Formula IV in which $g$ is 1 or 2 respectively. To make compounds of Formula II in which $n$ and $m$ are 1, the following cyclammonium quaternary salt is used to advantage:

(V) 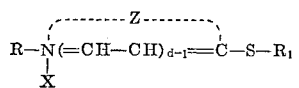

wherein $d$, R, X and Z are as previously defined and $R_5$ represents an alkyl group of from 1–12 carbon atoms, e.g., methyl to dodecyl, benzyl, phenylethyl, etc., groups, or an aryl group, e.g., phenyl, p-tolyl, etc. groups, in the proportion of approximately one mole of the 2,5-dihydroxy-1,4-benzoquinone to two moles of the compound represented by above formula. The reaction conditions used are generally the same as described in the preceding method. Another method is to react under essentially the conditions described in the above methods 3,6-dianilinomethylene-1,2,4,5-cyclohexanetetrone with a cyclammonium salt selected from those represented by the general formula:

(VI) 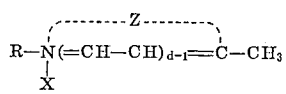

in approximately the proportions of one mole of the former compound to two moles of the latter compound. Still another is to react 2,5-dihydroxy-1,4-benzoquinone with a mixture of a cyclammonium salt selected from those represented by above Formula VI and 1,1,3-trimethoxypropene as illustrated in Example 7, in the proportions of approximately one mole of the 2,5-dihydroxy-1,4-benzoquinone and two moles of the salt compound.

To prepare the dye compounds of the invention, wherein Z and $Z_1$ are different heterocyclic groups and $n$ and $m$ are the same or different integers, a dye compound of Formula I (wherein $R_2$ is a hydrogen atom) is reacted wtih a cyclammonium salt selected from those represented by above Formulas IV and V. The reactions are carried out, in general, as described in the preceding methods at temperatures up to reflux temperatures of the reaction mixtures, and in the presence of a basic condensing agent such as the mentioned tertiary amines. Approximately equimolar proportions of the reactants are employed.

The following examples will serve to illustrate more fully the manner whereby we prepare the new dye compounds of the invention, and the use thereof in photographic processes and materials.

EXAMPLE 1

*3,6-Di-(3-Ethyl-2-Benzothiazolinylidene)-1,2,4,5-Cyclohexanetetrone*

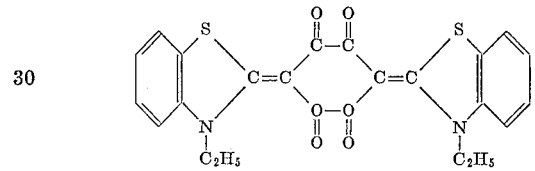

2,5-dihydroxy-1,4-benzoquinone (0.70 g., 1 mol.), 3-ethyl-2-phenylthiobenzothiazolium iodide (3.99 g., 2 mol.) and triethylamine (2 ml., 1 mol.+40%) were added to pyridine (20 ml.) and the mixture was heated under reflux for ten minutes. After cooling, the crude dye was collected on a funnel, washed with methanol and dried. The crude dye was purified by dissolving in hot cresol and filtering into methanol. The purified dye was collected on a funnel, washed with methanol and dried. After two such purifications, the yield of pure dye was 0.36 g. (16%), M.P. >330° C.

EXAMPLE 2

*3,6-Di[(3-Ethyl-2-Benzothiazolinylidene)Ethylidene]-12,,4,5-Cyclohexanetetrone*

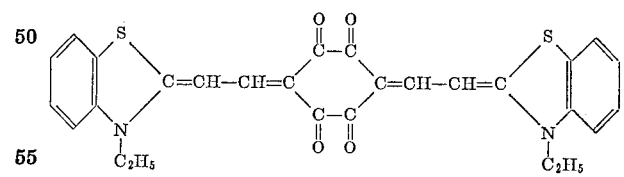

2,5-dihydroxy-1,4-benzoquinone (0.70 g., 1 mol.), 2-β-acetanilidovinyl-3-ethylbenzothiazolium iodide (4.50 g., 1 mol.) and triethylamine (2 ml., 1 mol.+40%) were added to pyridine and the mixture heated under reflux for fifteen minutes. The crude dye was collected on a filter, washed with pyridine and dried. After two recrystallizations, by dissolving in cresol and filtering into methanol, the yield of purified dye was 1.42 g. (55%), M.P. >330° C.

EXAMPLE 3

*3,6-Di[(3-Ethyl-2-Benzoxazolinylidene)Ethylidene]-1,2,4,5-Cyclohexanetetrone*

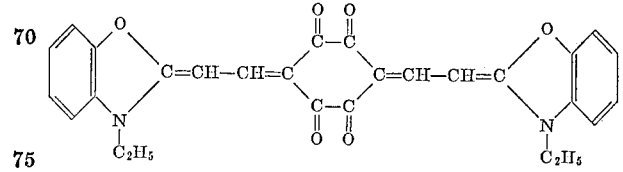

2,5-dihydroxy-1,4-benzoquinone (0.70 g., 1 mol.), 2-β-acetanilidovinyl-3-ethylbenzoxazolium iodide (4.50 g., 2 mols.) and triethylamine (2 ml., 2 mol.+40%) were added to pyridine (20 ml.) and the mixture heated under reflux for fifteen minutes. After cooling, the crude dye was collected on a funnel, washed with pyridine and dried. After two recrystallizations by dissolving in cresol and filtering into methanol, the yield of purified dye was 1.80 g. (74%), M.P. >330° C.

EXAMPLE 4

*3 - [(3 - Ethyl - 2-Benzothiazolinylidene)Ethylidene]-6-
[(3 - Ethyl - 2 - Benzoxazolinylidene)Ethylidene]-1,2,
4,5- Cyclohexanetetrone*

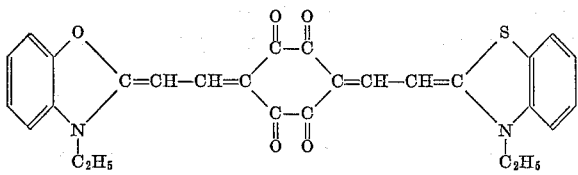

3 - [(3 - ethyl-2-benzoxazolinylidene)ethylidene]-1,2,4,5-cyclohexanetetrone, prepared according to Example 12 (1.56 g., 1 mol.), 2-β-acetanilidovinyl-3-ethylbenzothiazolium iodide (2.25 g., 1 mol.) and triethylamine (1.4 ml., 1 mol.+100%) were added to pyridine (20 ml.) and the mixture was heated under reflux for ten minutes. After chilling, the crude dye was collected on a funnel, washed with methanol and dried. The dye was purified by dissolving in hot cresol and filtering into methanol, collecting and washing with methanol. After two such treatments, the yield of pure dye was 1.3 g. (52%), M.P. >310° C.

EXAMPLE 5

*3 - (3 - Ethyl - 2 - Benzothiazolinylidene)-6-[(3-Ethyl-2 - Benzothiazolinylidene)Ethylidene] - 1,2,4,5 - Cyclohexanetetrone*

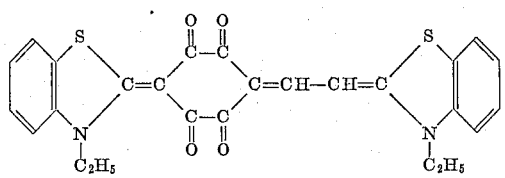

3 - [(3 - ethyl-2-benzothiazolinylidene)ethylidene]-1,2,4,5-cyclohexanetetrone prepared according to Example 11 (1.63 g., 1 mol.), 3-ethyl-2-ethylthiobenzothiazolium ethylsulfate (3.49 g., 1 mol.+100%), triethylamine (1.4 ml., 1 mol.+100%) were added to pyridine and the mixture heated under reflux for ten minutes. After chilling, the crude dye was collected on a funnel, washed with methanol and dried. The crude dye was purified by dissolving in hot cresol and filtering into methanol, collecting the dye on a funnel, washing with methanol and drying. After two such treatments, the yield of purified dye was 0.50 g. (21%), M.P. >310° C.

EXAMPLE 6

*3 - [4 - (3 - Ethyl-2-Benzothiazolinylidene)-2-Butenylidene] - 6 - [(3-Ethyl-2-Benzothiazolinylidene)Ethylidene]-1,2,4,5-Cyclohexanetetrone*

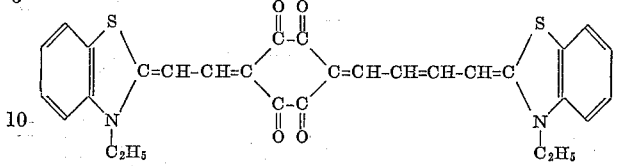

3 - [(3 - ethyl - 2-benzothiazolinylidene)ethylidene]-1,2,4,5-cyclohexanetetrone prepared according to Example 11 (1.63 g., 1 mol.), 2-β-acetanilidobutadienyl-3-ethylbenzothiazolium iodide (2.38 g., 1 mol.) and triethylamine (1.4 ml., 1 mol.+100%) were added to pyridine (20 ml.) and the mixture was heated under reflux for five minutes. After chilling, the crude dye was collected on a funnel, washed with methanol and dried. The crude dye was purified by dissolving in hot cresol, filtering into methanol, collecting on a funnel and washing with methanol. After two such treatments, the yield of purified dye was 0.69 g. (25%), M.P. >310° C.

EXAMPLE 7

*3,6-Di[4-(3-Ethyl-2-Benzothiazolinylidene)-2-Butenylidene]-1,2,4,5-Cyclohexanetetrone*

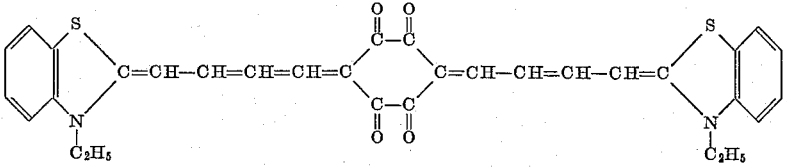

2,5-dihydroxy-1,4-benzoquinone (1.40 g., 1 mol.), 3-ethyl-2-methylbenzothiazolium p-toluenesulfonate (10.5 g., 2 mol.+50%) and trimethoxypropene (5.3 g., 1 mol.+300%) were added to pyridine (30 ml.) and the mixture heated under reflux for ten minutes. The reaction mixture was then cooled and diluted with methanol (200 ml.). The crude dye was collected on a funnel, washed with methanol and dried. The crude dye was purified by dissolving in hot cresol, filtering into methanol, collecting on a funnel, and washing with methanol. After two such treatments, the yield of purified dye was 0.65 g. (12%), M.P. >310° C.

EXAMPLE 8

*3,6-Di[(1-Ethyl-3,3-Dimethyl-2-Indolinylidene)Ethylidene]-1,2,4,5-Cyclohexanetetrone*

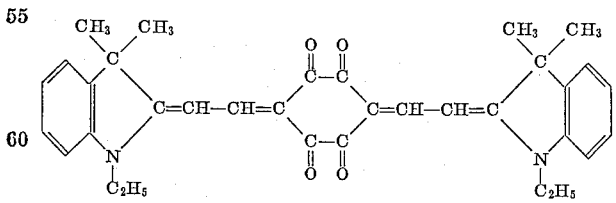

3,6 - dianilinomethylene - 1,2,4,5 - cyclohexanetetrone prepared according to Example 13 (1.15 g., 1 mol.), 1-ethyl-2,3,3-trimethylpseudoindolium iodide (3.15 g., 2 mols.+50%) and triethylamine (1.4 ml., 2 mols.+50%) were added to pyridine (15 ml.) and the mixture heated under reflux for ten minutes. After chilling, the crude dye was collected on a funnel, washed with methanol and dried. The dye was purified in hot cresol, filtering into methanol, collecting on a funnel and washing with methanol. After two such treatments, the yield of purified dye was 0.81 g. (45%), M.P. >310° C.

EXAMPLE 9

*3,6-Di[(1-Ethyl-2(1H)-Quinolylidene)Ethylidene]-1,2,4,5-Cyclohexanetetrone*

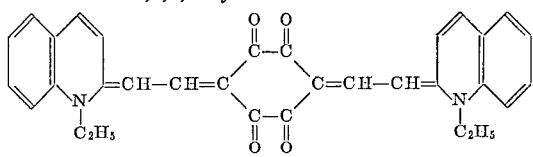

3,6 - dianilinomethylene - 1,2,4,5 - cyclohexanetetrone prepared according to Example 13 (1.73 g., 1 mol.), 1-ethylquinaldinium p-toluenesulfonate (5.25 g., 2 mole.+50%) and triethylamine (1.4 ml., 2 mols.) were added to pyridine (20 ml.) and the mixture heated under reflux for ten minutes. After chilling, the crude dye was collected on a funnel, washed with methanol and dried. The dye was purified by dissolving in hot cresol, filtering into methanol, collecting on a funnel and washing with methanol. After two such treatments, the yield of purified dye was 1.1 g. (44%), M.P.>310° C.

EXAMPLE 10

*3,6-Di[1-Ethyl-4(1H)Quinolylidene)Ethylidene]-1,2,4,5-Cyclohexanetetrone*

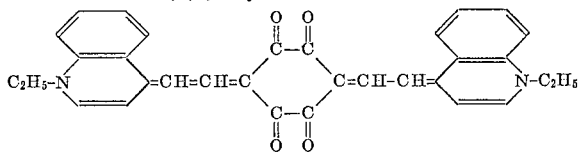

3,6 - dianilinomethylene - 1,2,4,5 - cyclohexanetetrone prepared according to Example 13 (1.73 g., 1 mol), 1-ethyllepidinium iodide (4.5 g., 2 mols.+50%), triethylamine (1.4 ml., 2 mols.) were added to pyridine (20 ml.) and the mixture heated under reflux for ten minutes. After chilling, the crude dye was collected on a funnel, washed with methanol and dried. The dye was purified by dissolving in hot cresol, filtering into methanol, collecting on a funnel and washing with methanol. After two such treatments, the yield of purified dye was 1.1 g. (44%), M.P. >310° C.

EXAMPLE 11

*3-[(3-Ethyl-2-Benzothiazolinylidene)Ethylidene]-1,2,4,5-Cyclohexanetetrone*

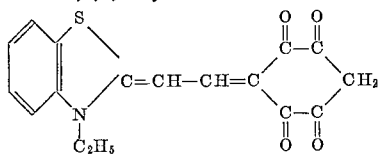

2,5-dihydroxy-1,4-benzoquinone (28 g., 1 mol.+100%) and 2-β-acetanilidovinyl-3-ethylbenzothiazolium iodide (45 g., 1 mol.) were added to ethanol (200 ml.) and the mixture heated to reflux with stirring. The heat was removed and triethylamine (28 ml., 1 mol.+100%) was added. The reaction mixture was allowed to cool to room temperature, acidified with acetic acid and the crude dye collected on a funnel, washed with methanol and dried. The dye was purified by dissolving in hot water containing triethylamine, filtering, acidifying the filtrate with acetic acid, collecting the dye on a funnel and washing with methanol. After two such treatments, the yield of pure dye was 19.7 g. (61%), M.P.>310° C.

EXAMPLE 12

*3-[(3-Ethyl-2-Benzoxazolinylidene)Ethylidene]-1,2,4,5-Cyclohexanetetrone*

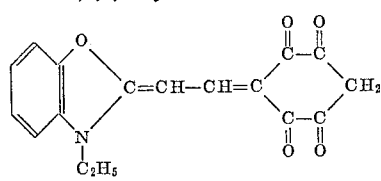

2,5-dihydroxy-1,4-benzoquinone (28.0 g., 1 mol. +100%) and 2-β-acetanilidovinyl-3-ethylbenzoxazolium iodide (43.6 g., 1 mol.) were suspended in ethanol (200 ml.) and heated to reflux with stirring. The heat was then removed and triethylamine (28 ml., 1 mol.+100%) added with stirring. The mixture was then allowed to cool to room temperature, acidified with acetic acid and the crude product collected on a funnel, washed with methanol and dried. The crude dye was purified by dissolving in hot water containing triethylamine, filtering, acidifying the filtrate with acetic acid, collecting the dye on a funnel, washing with methanol and drying. After two such treatments, the yield of purified dye was 15.2 g. (51%), M.P. >310° C.

EXAMPLE 13

*3,6-Dianilinomethylene-1,2,4,5-Cyclohexanetetrone*

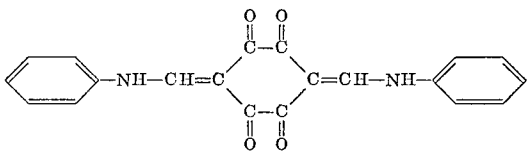

2,5-dihydroxy-1,4-benzoquinone (14.0 g., 1 mol.) and ethylisoformanilide (30 g., 1 mol.) were dissolved in pyridine (100 ml.) and heated under reflux for ten minutes. After cooling, the crude product was collected on a funnel then slurried with methanol and again collected. The crude product was then slurried with pyridine collected on a funnel, washed with pyridine and dried. The yield of dark yellow crystals was 22 g. (63%), M.P. >310° C.

For the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are desensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of our new dyes in the emusion can be widely varied, i.e., generally from about 10 to about 200 mg. per mole of silver halide. The specific concentration will vary according to the type of light-sensitive material in the emulsion and according to the effects desired. The most advantageous dye concentration for any given emulsion can be readily determined by making the tests and observations customarily used in the art of emulsion making. Our emulsions are coated to advantage on any of the support materials used for photographic elements, for example, paper, glass, cellulose derivatives, such as cellulose acetate, cellulose acetate-propionate, cellulose nitrate, etc., synthetic resins, such as polystyrene, polyethylene terephthalate and other polyesters, polyamides such as nylon, and the like.

To prepare a gelatino-silver halide emulsion desensitized with one of our new dyes, the following procedure is satisfactory: A quantity of the dye is dissolved in a suitable solvent, and a volume of this solution containing the desired amount of dye is slowly added with intimate mixing to about 1,000 cc. of a light-sensitive gelatino-silver halide emulsion. With most of our dyes from about 1 to 20 mg. of dye per liter of emulsion suffices to produce the desired desensitizing effect with the ordinary light-sensitive gelatino-silver bromide (including bromo-iodide and chlorobromide) and fine-grain emulsions which include most of the ordinary employed light-sensitive gelatino-silver chloride emulsions. Somewhat smaller or even larger concentrations of dye may be necessary to secure the desired degree of desensitization. While the preceding has dealt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting our invention in any sense, as it will be apparent that our dyes can be incorporated by other methods in many of the emulsions customarily used in the art. For instance, in a less preferred method, the dyes can be incorporated by bathing a plate or film bearing an emulsion, in a solution of the dye.

Our invention is still further illustrated by the following tabulation showing the relative speed data and percent desensitization produced in a gelatino-silver bromiodide emulsion by representative dyes of our invention. The dyes, dissolved in suitable solvents were added to separate portions of the emulsions at the concentrations indicated. After digestion at 50° C. for 10 minutes, the emulsions were coated on a cellulose acetate film support.

A control coating was made of an emulsion containing no dye. A sample of each coating was exposed with a sensitometer to a light source modulated with a Wratten #35 and #38A filter. The exposed film strips were developed in a conventional developer having the formula:

| | G. |
|---|---|
| p-Methylaminophenol sulfate | 2.0 |
| Sodium sulfite, desiccated | 90.0 |
| Hydroquinone | 8.0 |
| Sodium carbonate, monohydrated | 52.5 |
| Potassium bromide | 5.0 |

Water to make 1 liter.

The developed strips were then fixed with a conventional fixing bath, washed and dried. From densitometric measurements the relative speeds were determined for each sample based on an arbitrary value of 100 for the control. The data obtained are tabulated below.

| Dye of Example No.— | Dye Concentration, g./mole Silver Halide | Relative Speed | Percent Desensitization |
|---|---|---|---|
| 2 | .04 | 71 | 29 |
| 3 | .04 | 71 | 29 |
| 4 | .04 | 45 | 55 |
| 5 | .08 | 15.9 | 84.1 |
| 6 | .02 | 28 | 72 |
| 7 | .01 | 22.5 | 77.5 |
| 8 | .04 | 32 | 68 |
| 9 | .04 | 40 | 60 |
| 10 | .04 | 25 | 75 |
| 11 | .08 | 50 | 50 |
| Control | 0 | 100 | 0 |

From the data it can be seen that representative dyes of our invention desensitize up to 84% under the conditions used. Similarly, it can be shown that other dyes of our invention are valuable desensitizers for photographic silver halide emulsions. Although gelatino-silver halide emulsions were used for illustrative purposes, it is to be understood that our desensitizers are also used to advantage in emulsions in which gelatin is replaced by hydrophilic colloids mentioned previously as gelatin substitutes.

Our desensitizing dyes are employed to advantage in photographic elements where desensitization is required, for example, in making photographic silver halide emulsions used for the direct production of positive images, such as are described by Kendall et al. U.S. Patent 2,541,472, issued February 13, 1951, Kendall et al. U.S. Patent 2,669,515, issued February 16, 1954, Hillson U.S. Patent 3,062,651, issued November 6, 1962, etc.

The invention has been described in detail with particular reference to preferred embodiments thereof but it will be understood that variations and modifications can be effected within the spirit and scope of the invention as described hereinabove and as defined in the appended claims.

We claim:

1. A dye compound selected from those represented by the following formulas:

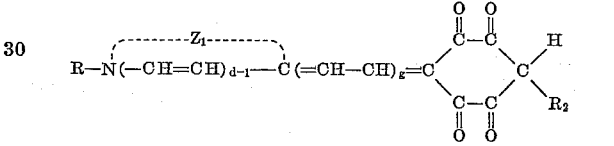

and

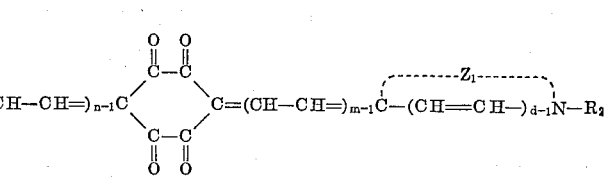

wherein $n$ and $m$ each represents a positive integer of from 1 to 3, $d$ represents a positive integer from 1 to 2, R and $R_1$ each represents an alkyl group of from 1–12 carbon atoms, $R_2$ represents a member selected from the group consisting of the hydrogen atom, an alkyl group of from 1–18 carbon atoms and an aryl group, and Z and $Z_1$ each represents the non-metallic atoms necessary to complete a heteroyclic nucleus selected from the nuclei consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkyl-indolenine series, those of the 2-pyridine series, those of the 4-pyridine series, those of the imidazole series, those of the benzimidazole series, and those of the naphthimidazole series, and $g$ is an integer from 1–2.

2. A dye compound of the formula:

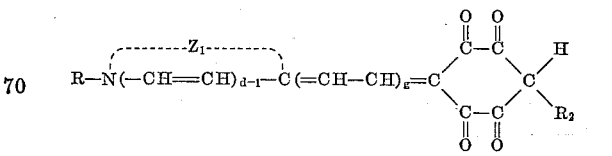

wherein $d$ represents a positive integer of from 1 to 2, R represents an alkyl group of from 1–12 carbon atoms, $R_2$ represents a member selected from the group conand

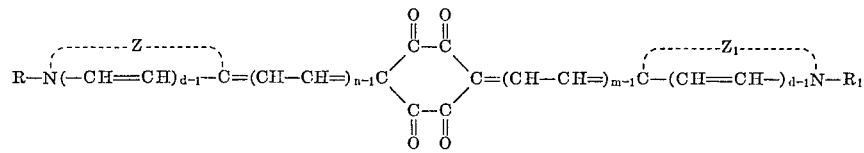

sisting of the hydrogen atom, an alkyl group of from 1–18 carbon atoms and an aryl group, and Z represents the non-metallic atoms necessary to complete a heterocyclic nucleus selected from the nuclei consisting of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, those of the 4-pyridine series, those of the imidazole series, those of the benzimidazole series, and those of the naphthimidazole series, and $g$ is an integer from 1–2.

3. A dye compound of the formula:

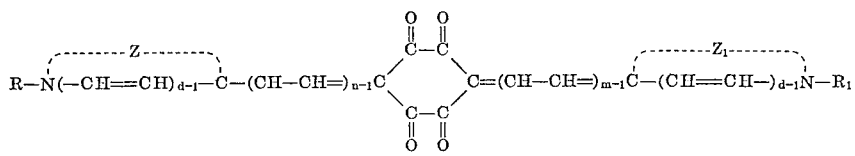

wherein $n$ and $m$ each represents a positive integer of from 1–3, $d$ represents a positive integer of from 1–2, R and $R_1$ each represents an alkyl group of from 1–12 carbon atoms, and Z and $Z_1$ each represents the non-metallic atoms necessary to complete a heterocyclic nucleus selected from the nuclei consisting of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, those of the 4-pyridine series, those of the imidazole series, those of the benzimidazole series, and those of the naphthimidazole series.

4. The dye 3-[(3-ethyl-2-benzothiazolinylidene)ethylidene]-1,2,4,5-cyclohexanetetrone.

5. The dye 3-(3-ethyl-2-benzothiazolinylidene)-6-[(3-ethyl - 2 - benzothiazolinylidene)ethylidene] - 1,2,4,5-cyclohexanetetrone.

6. The dye 3,6-di-[(1-ethyl-4(1H)quinolylidene)ethylidene]-1,2,4,5-cyclohexanetetrone.

7. The dye 3-[(3-ethyl-2-benzothiazolinylidene)ethylidene] - 6 - [(3 - ethyl - 2 - benzoxazolinylidene)ethylidene]-1,2,4,5-cyclohexanetetrone.

8. The dye 3,6-di[(1-ethyl-2(1H)-quinolylidene)ethylidene]-1,2,4,5-cyclohexanetetrone.

9. A light-sensitive photographic silver halide emulsion containing a desensitizing dye selected from those represented by the following formulas:

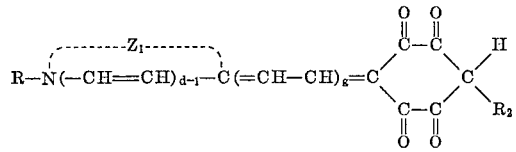

wherein $n$ and $m$ each represents a positive integer of from 1 to 3, $d$ represents a positive integer from 1 to 2, R and $R_1$ each represents an alkyl group of from 1–12 carbon atoms, $R_2$ represents a member selected from the group consisting of the hydrogen atom, an alkyl group of from 1–18 carbon atoms and an aryl group, and Z and $Z_1$ each represents the non-metallic atoms necessary to complete a heterocyclic nucleus selected from the nuclei consisting of those of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, those of the 4-pyridine series, those of the imidazole series, those of the benzimidazole series, and those of the naphthimidazole series, and $g$ is an integer from 1–2.

10. A light-sensitive photographic silver halide emulsion containing a desensitizing dye of the formula:

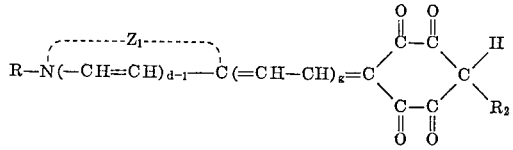

wherein $d$ represents a positive integer of from 1 to 2, R represents an alkyl group of from 1–12 carbon atoms, $R_2$ represents a member selected from the group consisting of the hydrogen atom, an alkyl group of from 1–18 carbon atoms and an aryl group, and Z represents the non-metallic atoms necessary to complete a heterocyclic nucleus selected from the nuclei consisting of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, those of the 4-pyridine series, those of the imidazole series, those of the benzimidazole series, and those of the naphthimidazole series, and $g$ is an integer from 1–2.

11. A light-sensitive photographic silver halide emulsion containing a desensitizing dye of the formula:

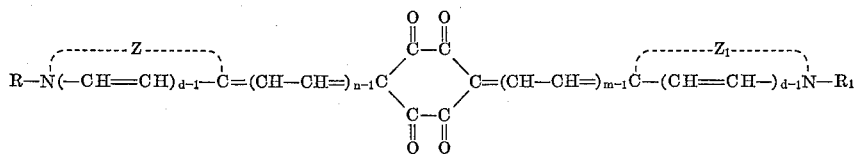

wherein $n$ and $m$ each represents a positive integer of from 1–3, $d$ represents a positive integer of from 1–2, R and $R_1$ each represents an alkyl group of from 1–12 carbon atoms, and Z and $Z_1$ each represents the non-metallic atoms necessary to complete a heterocyclic nucleus selected from the nuclei consisting of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, those of the 4-pyridine series, those of the imidazole series, those of the benzimidazole series, and those of the naphthimidazole series.

12. A light-sensitive photographic silver halide emulsion containing the desensitizing dye 3-[(3-ethyl-2-benzothiazolinylidene)ethylidene]-1,2,4,5-cyclohexanetetrone.

13. A light-sensitive photographic silver halide emulsion containing the desensitizing dye 3-(3-ethyl-2-benzothiazolinylidene) - 6 - [(3 - ethyl - 2 - benzothiazolinylidene)ethylidene] 1,2,4,5-cyclohexanetetrone.

14. A light-senstive photographic silver halide emulsion containing the desensitizing dye 3,6-di[(1-ethyl-4-(1H) - quinolylidene)ethylidene] - 1,2,4,5 - cyclohexanetetrone.

15. A light-sensitive photographic silver halide emulsion containing the desensitizing dye 3-[(3-ethyl-2-benzothiazolinylidene)ethylidene] - 6 - [(3 - ethyl - 2 - benzoxazolinylidene)ethylidene]-1,2,4,5-cyclohexanetetrone.

16. A light-sensitive photographic silver halide emulsion containing the desensitizing dye 3,6-di[(1-ethyl-2-(1H)quinolylidene)ethylidene] - 1,2,4,5 - cyclohexanetetrone.

17. A light-sensitive photographic element comprising a support having coated thereon at least one layer of the photographic emulsion of claim 9.

References Cited in the file of this patent
UNITED STATES PATENTS

| | | |
|---|---|---|
| 2,293,261 | Kendall | Aug. 18, 1942 |
| 2,895,955 | Haseltine et al. | July 21, 1959 |
| 2,954,292 | Duffin et al. | Sept. 27, 1960 |
| 2,984,664 | Fry et al. | May 16, 1961 |

UNITED STATES PATENT OFFICE
CERTIFICATE OF CORRECTION

Patent No. 3,140,951                                July 14, 1964

Donald W. Heseltine et al.

It is hereby certified that error appears in the above numbered patent requiring correction and that the said Letters Patent should read as corrected below.

Column 3, lines 7 to 14, the lower right-hand portion of formula (III), for same column 3, lines 55 to 58, the right-hand portion of formula (V), for "$-R_1$" read -- $-R_5$ --; column 4, line 48, for "12,,4,5-", in italics, read -- 1,2,4,5- --, in italics; column 11, lines 29 to 34, for that portion of the formula reading

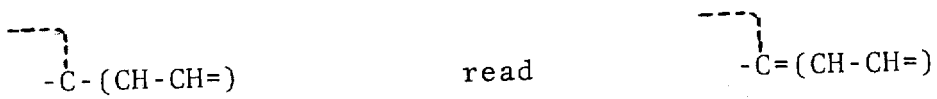

column 14, line 2, after the closing bracket insert a hyphen.

Signed and sealed this 26th day of April 1966.

(SEAL)
Attest:

ERNEST W. SWIDER
Attesting Officer

EDWARD J. BRENNER
Commissioner of Patents